(12) United States Patent
DeLine

(10) Patent No.: US 6,983,920 B2
(45) Date of Patent: Jan. 10, 2006

(54) REARVIEW MIRROR MOUNTING ASSEMBLY

(75) Inventor: Jonathan E. DeLine, Raleigh, NC (US)

(73) Assignee: Donnelly Corporation, Holland, MI (US)

( * ) Notice: Subject to any disclaimer, the term of this patent is extended or adjusted under 35 U.S.C. 154(b) by 494 days.

(21) Appl. No.: 10/397,599

(22) Filed: Mar. 26, 2003

(65) Prior Publication Data

US 2003/0160146 A1 Aug. 28, 2003

Related U.S. Application Data

(62) Division of application No. 09/470,791, filed on Dec. 23, 1999, now Pat. No. 6,540,193.

(51) Int. Cl.
A47G 1/24 (2006.01)

(52) U.S. Cl. .......................................... 248/481; 248/61
(58) Field of Classification Search ................. 248/481, 248/483, 484, 288.31, 288.51, 478, 61, 68.1; 359/871, 872, 873; 138/112
See application file for complete search history.

(56) References Cited

U.S. PATENT DOCUMENTS

| | | | |
|---|---|---|---|
| 541,727 A | 6/1895 | Dennis | |
| 1,521,508 A | 12/1924 | Denoux | |
| 1,800,797 A | 4/1931 | Hoople | |
| 1,857,095 A | 5/1932 | Glowacki | |
| 2,303,108 A | * 11/1942 | Blackburn | 248/61 |
| 2,414,223 A | * 1/1947 | De Virgilis | 362/141 |
| 2,456,182 A | 12/1948 | Goble | 285/92 |
| 2,763,188 A | 9/1956 | Bertell | 88/98 |
| 2,856,815 A | 10/1958 | Ross | 88/98 |
| 2,921,808 A | 1/1960 | David | 287/12 |
| 2,973,980 A | 3/1961 | Vogt et al. | 287/87 |
| 3,009,712 A | 11/1961 | Williams | 280/95 |
| 3,022,096 A | 2/1962 | Schwartz | |
| 3,104,897 A | 9/1963 | Berger | 285/166 |
| 3,177,020 A | 4/1965 | Dumpis | 287/87 |
| 3,367,616 A | 2/1968 | Bausch et al. | 248/483 |
| 3,374,016 A | 3/1968 | Melton et al. | 287/87 |
| 3,448,553 A | 6/1969 | Herr et al. | 52/400 |
| 3,498,579 A | 3/1970 | Vicary | 248/483 |
| 3,530,495 A | 9/1970 | Kindel | 287/87 |
| 3,601,352 A | 8/1971 | Jensen et al. | 248/481 |
| 3,622,112 A | 11/1971 | Stroh | 248/181 |
| 3,635,435 A | 1/1972 | Perison, Sr. | 248/475 |
| 3,774,996 A | 11/1973 | Donnelly | 350/302 |
| 3,841,769 A | 10/1974 | Bowerman | |

(Continued)

FOREIGN PATENT DOCUMENTS

| | | | |
|---|---|---|---|
| GB | 1132384 | | 10/1968 |
| GB | 2332475 A | * | 6/1999 |
| WO | WO/02/26066 | * | 4/2002 |

Primary Examiner—Korie Chan
(74) Attorney, Agent, or Firm—Van Dyke, Gardner, Linn & Burkhart, LLP

(57) ABSTRACT

A support assembly for pivotally securing an accessory to a vehicle includes a mounting base adapted for mounting to the vehicle and a mounting arm pivotally secured to the mounting base and the accessory. The accessory has at least one electronic component which is electrically connected to a vehicle wiring via an accessory wiring. The mounting base includes a first ball receiving socket. The mounting arm includes a first ball member for pivotally engaging the first ball receiving socket and a second ball member for pivotally engaging a second ball receiving socket on the accessory. The first ball member is positioned at an opposite end of the mounting arm from the second ball member. The mounting arm further includes an outer sleeve which may at least partially encase the mounting arm and the accessory wiring. The outer sleeve may provide a channel therealong for receiving the accessory wiring.

6 Claims, 5 Drawing Sheets

U.S. PATENT DOCUMENTS

| | | | |
|---|---|---|---|
| 4,068,966 A * | 1/1978 | Johnson et al. | 403/397 |
| 4,254,931 A | 3/1981 | Aikens et al. | 248/549 |
| 4,382,572 A | 5/1983 | Thompson | 248/484 |
| 4,492,488 A | 1/1985 | Warshawsky | |
| 4,614,412 A | 9/1986 | Cohen | 350/632 |
| 4,632,348 A | 12/1986 | Keesling et al. | 248/222.1 |
| 4,646,210 A | 2/1987 | Skogler et al. | 362/142 |
| 4,822,140 A | 4/1989 | Mittelhauser | 350/279 |
| 4,930,742 A * | 6/1990 | Schofield et al. | 248/475.1 |
| 4,936,533 A | 6/1990 | Adams et al. | 248/222.1 |
| 5,100,093 A | 3/1992 | Rawlinson | |
| 5,100,095 A | 3/1992 | Haan et al. | 248/549 |
| 5,308,247 A | 5/1994 | Dyrdek | 439/34 |
| 5,327,288 A | 7/1994 | Wellington et al. | 359/606 |
| 5,521,760 A | 5/1996 | De Young et al. | 359/601 |
| 5,572,354 A | 11/1996 | Desmond et al. | 359/265 |
| 5,576,687 A | 11/1996 | Blank et al. | 340/38 |
| 5,669,698 A | 9/1997 | Veldman et al. | 362/3.1 |
| 5,671,996 A | 9/1997 | Bos et al. | |
| 5,820,097 A | 10/1998 | Spooner | 248/549 |
| 5,984,482 A | 11/1999 | Rumsey et al. | 359/871 |
| 6,428,172 B1 * | 8/2002 | Hutzel et al. | 359/838 |
| 6,588,714 B2 * | 7/2003 | Blane et al. | 248/68.1 |

* cited by examiner

REARVIEW MIRROR MOUNTING ASSEMBLY

CROSS-REFERENCE TO RELATED APPLICATION

This is a division of U.S. patent application, Ser. No. 09/470,791, filed Dec. 23, 1999 now U.S. Pat. No. 6,540,193 by DeLine for REARVIEW MIRROR MOUNTING ASSEMBLY, the disclosure of which is hereby incorporated by reference herein.

BACKGROUND OF THE INVENTION

The present invention relates generally to a rearview mirror mounting assembly and, more particularly, to a rearview mirror mounting assembly which pivotally mounts an interior rearview mirror to a mounting base attached to the vehicle.

Mounting brackets for supporting rearview mirrors are well known in the art. Typically, a rearview mirror is mounted to a mounting base via one or more ball and socket connections or joints. The double jointed mounting bracket allows for further movement of the interior rearview mirror relative to the mounting base, which is typically secured to an interior surface of the windshield of the vehicle or to a headliner or console at an upper edge of the windshield. The bracket must tightly retain a ball within the socket of the ball and socket joint, while still allowing relative rotation or pivoting therebetween. If the joints are not tightly secured, the interior rearview mirror may experience excessive vibration when the vehicle is being driven. These vibrational concerns are further enhanced when the interior rearview mirror comprises multiple components and electronic circuitry, such as electrochromic reflectors, microphones, map reading lights, and/or other accessories, which may add to the weight of the interior rearview mirror. These accessories increase the weight of the mirrors, such that the mirrors are not stable with a conventional double ball and socket-mounting bracket.

It is known to implement larger sized ball and socket joints to provide increased friction and thus greater stability between the ball and socket members of the mounting bracket. The larger ball further allows for a larger neck on the mounting bracket to increase bending inertia of the bracket. At the same time, however, it is preferred to minimize the size of the bracket components to enhance the appearance of the mirror assembly.

In order to provide a tight grip on the ball member, a spring or other biasing member may be implemented within a support arm of the mounting assembly in order to increase the gripping or clamping of the ball by the socket portion of the assembly. The spring is typically mounted and secured within the arm such that the spring exerts a force on the socket portion, which causes the socket to partially compress about the ball. A raised portion or ridge on the socket portion is provided which extends partially within the center of the spring, in order to properly align the spring within the mounting arm. The spring thus has to have a sufficient diameter to receive the raised portion within the coils of the spring.

These operational aspects of rearview mirror supports illustrated a need for supporting higher weight, added feature rearview mirrors while minimizing vibration, and for reducing functional problems in mirror supports such as misaligned springs, all while maintaining a pleasing overall appearance.

SUMMARY OF THE INVENTION

The present invention is intended to provide a mirror mounting assembly which pivotally mounts an interior rearview mirror to a mounting base positioned on the vehicle. Preferably, the mirror is mounted or connected to the mounting base via a dual ball and socket joint, at least one of which comprises a ball receiving cavity which pivotally receives a ball member therein. The ball receiving cavity maintains a secure grip on the ball member via a biasing member which is aligned and contained within a sleeve of the mounting assembly. The present invention is preferably implemented with an interior rearview mirror which comprises one or more electrical accessories and is thus of a greater weight than a standard mirror. For example, the mirror may weigh approximately 300 grams and may even weigh greater than approximately 500 grams.

According to a first aspect of the present invention, a support bracket for pivotally securing an accessory to a vehicle comprises a mounting base and a mounting arm. The mounting base is adapted for mounting to the vehicle. The mounting arm is pivotally securable to at least one of the mounting base and the accessory. The mounting arm comprises at least one ball receiving socket, a biasing member, an alignment element for aligning the biasing member. The alignment element comprises an outer confinement member which engages at least a portion of an outer surface of the biasing member.

Preferably, the mounting arm further comprises a sleeve which at least partially encases the ball receiving socket and the biasing member. The ball receiving socket pivotally receives a ball member of one of the mounting base and the accessory. The confinement member extends at least partially along the biasing member to align the biasing member within the sleeve such that the biasing member biases the ball receiving socket toward the ball member, thereby pivotally securing the ball member therein.

Preferably, the confinement member comprises an annular ring. Preferably, the alignment element further comprises a substantially planar surface at a base of the confinement member, whereby an end of said biasing member engages the planar surface. Preferably, the sleeve is narrowed at an end corresponding to the ball receiving socket. The narrowed end is operable to clamp the ball receiving socket about the ball member in response to the biasing member biasing the socket toward the narrowed end of the sleeve. Preferably, a second ball member is rigidly secured at an end of the sleeve opposite the narrowed end. A base portion of the second ball member comprises the alignment element to align the biasing member between the ball receiving socket and the second ball member.

In one form, the biasing member is a coil spring which engages a planar, recessed region in the ball receiving socket. In another form, the biasing member is unitarily formed with the ball receiving socket and compressibly engages a recessed region at one of a ball receiving socket of the mounting arm, a ball member of the mounting arm, and the mirror itself.

According to another aspect of the present invention, a support bracket pivotally secures an accessory to the vehicle. The accessory has at least one electronic component which is electrically connected to a vehicle wiring via an accessory wiring. The support bracket comprises a mounting base and a mounting arm. The mounting base is adapted for mounting to the vehicle and comprises a first ball receiving socket. The mounting arm pivotally secures to the mounting base and to the accessory. The mounting arm comprises a first ball member for pivotally engaging the first ball receiving socket and a second ball member for pivotally engaging a second ball receiving socket on the accessory. The first ball member is positioned at an opposite end of the mounting arm from the second ball member. The mounting arm further comprises an outer sleeve which at least partially encases the mounting arm and the accessory wiring.

Therefore, the present invention provides a support assembly which provides pivotable mounting of an accessory or mirror relative to a mounting base. The alignment of the biasing member is maintained via at least one confinement member, such as an annular guide which extends along the arm of the support assembly, which substantially precludes lateral movement of the biasing member relative to the support assembly. A second ball member of the support assembly may be rigidly secured to the sleeve to further reduce vibration of the mirror. The first and second ball members may comprise the same sized ball or may have different diameter ball members. For example, the second ball member of the support assembly may have a greater diameter than the first ball member of the mounting base.

BRIEF DESCRIPTION OF THE DRAWINGS

FIG. 9 is a perspective exploded view of another alternate embodiment of the present invention;

FIG. 10 is a sectional end view of a mounting arm and plastic cover, taken along the line X—X in FIG. 9.

DESCRIPTION OF THE PREFERRED EMBODIMENTS

Figure 1:
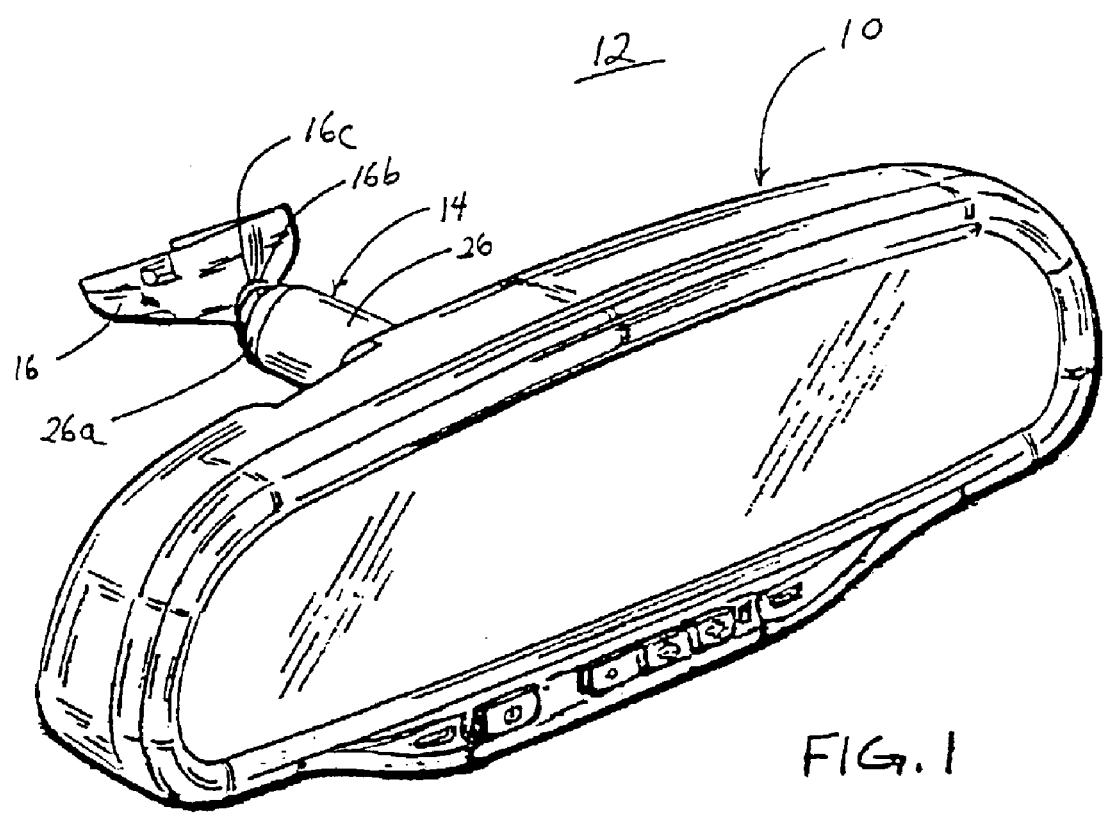
FIG. 1 is a perspective view looking forwardly in a vehicle of a rearview mirror mounting assembly in accordance with the present invention.
Figure 2:
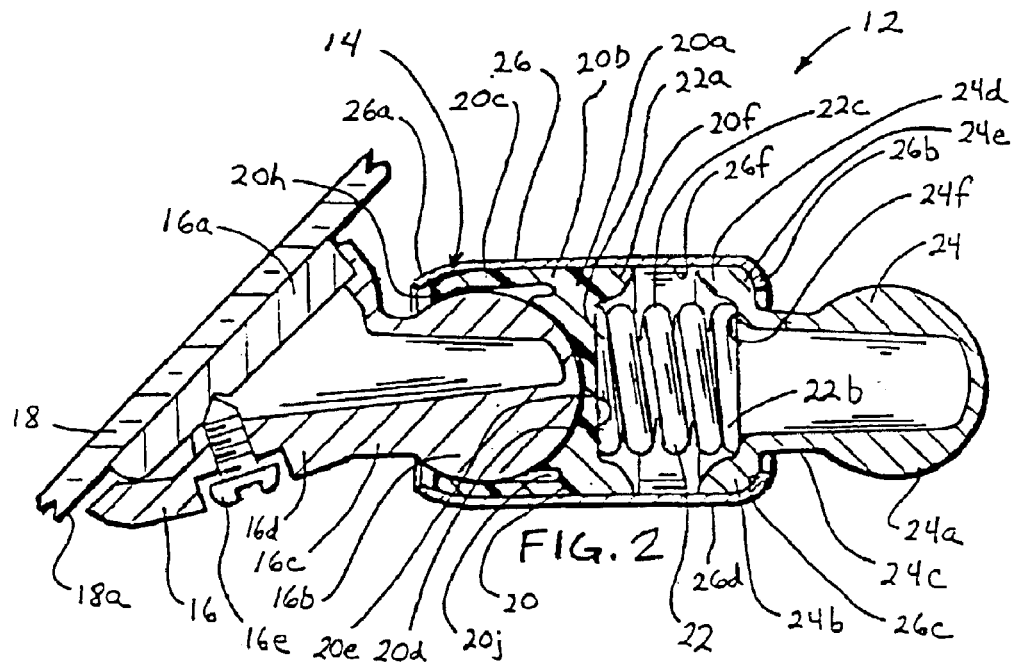
FIG. 2 is a sectional side view of the mounting assembly of FIG. 1.

Referring now specifically to the drawings, and the illustrative embodiments depicted therein, an accessory or interior rearview mirror 10 is pivotally mounted to a mounting assembly 12, which comprises a mounting arm 14, which is pivotally mounted to a mirror mount or mounting base 16 (FIG. 1). Mounting arm 14 of mounting assembly 12 preferably comprises a ball receiving member 20, a biasing member 22, a second ball member 24 and a sleeve member 26 which at least partially encases ball receiver 20, biasing member 22, and second ball member 24 (FIG. 2). Preferably, biasing member 22 is positioned and aligned between ball receiver 20 and second ball member 24 and functions to bias ball receiver 20 outwardly from second ball member 24 and biasing member 22, such that ball receiver 20 grips ball member 16b, as discussed in detail below. Biasing member 22 is aligned longitudinally along sleeve 26 between ball member 24 and ball receiver 20 via a confining member, such as a raised annular ring 20f, which is preferably at least partially cylindrical in section, and/or a corresponding confining member or annular ring 24d, which extend longitudinally from a respective base or generally planar surface 20e and/or 24f at either or both of ball receiver 20 and/or ball member 24, respectively, as discussed below.

The interior rearview mirror 10 may be a conventional electrochromic or prismatic day/night interior mirror and may comprise additional electronic components, such as map reading lights, a speaker and/or microphone, which may be in the mirror or within a module attached to the mirror or mounting arm as disclosed in commonly assigned co-pending U.S. patent application, Ser. No. 09/382,720, filed Aug. 25, 1999, now U.S. Pat. No. 6,243,003 an indicator for the microphone of the type disclosed in commonly assigned co-pending U.S. patent application, Ser. No. 09/396,179, filed Sep. 14, 1999, now U.S. Pat. No. 6,278,377, displays, such as of the type disclosed in commonly assigned co-pending U.S. patent application, Ser. No. 09/448,700, filed Nov. 24, 1999 by Timothy G. Skiver, Joseph P. McCaw, John T. Uken, and Jonathan E. DeLine for REARVIEW MIRROR ASSEMBLY WITH ADDED FEATURE MODULAR DISPLAY, now U.S. Pat. No. 6,329,925, communication systems, which may comprise a processing system of the type disclosed in commonly assigned co-pending U.S. patent application, Ser. No. 09/466,010, filed Dec. 17, 1999 by Jonathan E. DeLine, Niall R. Lynam, Ralph A. Spooner and Philip A. March for INTERIOR REARVIEW MIRROR SOUND PROCESSING SYSTEMS now U.S. Pat. No. 6,420,975, and/or the like, all of the disclosures of which are hereby incorporated herein by reference. Additionally, the interior rearview mirror may comprise storage capabilities, such as disclosed in commonly assigned co-pending U.S. patent application, Ser. No. 09/449,121, filed Nov. 24, 1999, now U.S. Pat. No. 6,428,172, and/or a compartment for electrical accessories, such as disclosed in commonly assigned co-pending U.S. patent application, Ser. No. 09/433,467, filed Nov. 4, 1999, now U.S. Pat. No. 6,326,613, and/or the like, the disclosures of which are hereby incorporated herein by reference. Because the rearview mirror may comprise one or more electrical accessories and may function to store other items, the mirror may have a greater weight than a standard prismatic mirror. Preferably, support assembly 12 supports an interior rearview mirror 10 weighing at least approximately 300 grams. More preferably, support assembly 12 supports an interior rearview mirror 10 which weighs at least approximately 400 grams and most preferably, at least approximately 500 grams.

The mount 16 may be secured, such as by an adhesive, to an interior surface 18a of a vehicle windshield 18 (FIG. 2) and may be a conventional mounting button, channel mount, a base member of the type disclosed in commonly assigned U.S. Pat. No. 4,936,533, issued to Adams et al., the disclosure of which is hereby incorporated herein by reference, or a breakaway mount of the type disclosed in commonly assigned U.S. Pat. No. 5,820,097, issued to Spooner, or U.S. Pat. No. 5,100,095, issued to Haan, et al., the disclosures of which are hereby incorporated herein by reference.

Preferably, as shown in FIG. 2, mounting base 16 of mounting assembly 12 is secured to a mounting plate 16a (commonly referred to in the art as a mirror mounting button), which is secured to interior surface 18a of the windshield 18. Mounting plate 16a may be secured to the interior surface of the windshield, such as by an adhesive, or may be secured to a headliner or console (not shown) at or adjacent to an upper edge of the windshield, without affecting the scope of the present invention. Mounting base 16 preferably comprises a ball member 16b formed at an end of a neck portion 16c extending outwardly and rearwardly from a base portion 16d of the mount 16. Ball member 16b and neck 16c are preferably integrally formed with base 16d and may comprise a metal, such as aluminum, such as A-380 aluminum, which may be powder painted to color match mount 16 with the trim and/or mirror housing of the vehicle. However, it is further envisioned that ball member 16b may comprise an engineering polymer, such as a filled polymer, such as glass or mineral filled Nylon or the like, without affecting the scope of the present invention. Ball member 16b is a generally spherical shaped ball for pivotal engagement with a correspondingly formed receiving socket on mounting arm 14, as discussed below. Preferably, the ball 16b and neck portion 16c are partially hollowed or cored to reduce the mass of the mounting assembly 12. Although not critical to the present invention, the mount 16 may be secured to the base portion 16a via a set screw 16e, as shown in FIG. 2, or via any other known mounting means, and may be a breakaway mount or any other mount secured to a headliner or console of the vehicle, without affecting the scope of the present invention.

As shown in FIGS. 1 and 2, sleeve 26 is a generally cylindrical member which extends between mount 16 and interior rearview mirror 10. Preferably, sleeve 26 comprises a metal tubing, such as an aluminum tubing, such as aluminum 6061 T9, which may be powder coated to match the color of the mount 16 and/or interior rearview mirror 10 and/or a desired vehicle interior or trim. However, other materials, such as an engineering polymer, such as a filled polymer, such as glass or mineral filled Nylon or the like, may be implemented without affecting the scope of the present invention. Sleeve 26 is generally hollow and comprises a cylindrical side wall 26d which defines an inner surface 26f and encases ball receiver 20, biasing member 22, and a portion of second ball member 24, as discussed below. Sleeve 26 is preferably tapered or narrowed toward a forward end 26a and further comprises an inwardly curved end 26b, which is generally longitudinally opposite from tapered end 26a. Inwardly turned end 26b is sharply curved radially inwardly to form a generally annular ridge or ring 26c, which closes a portion of the rearward end 26b, such that the end 26b has a smaller diameter opening than the cylindrical side walls 26d of sleeve 26.

Figure 3A:
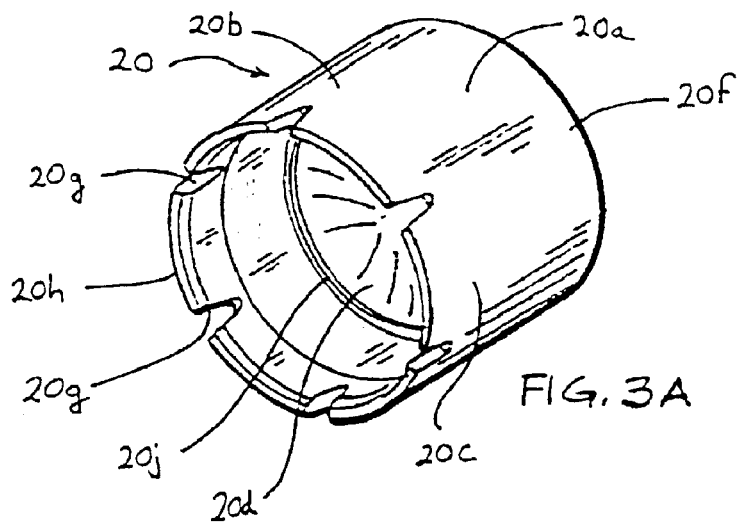
FIG. 3A is a perspective view of a ball receiving socket showing the ball receiving portion of the socket.
Figure 3B:
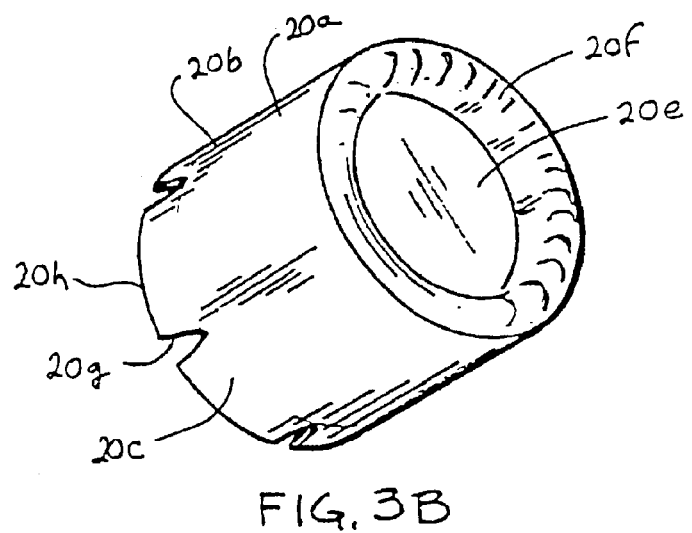
FIG. 3B is a perspective view of the opposite end of the socket of FIG. 3A, showing the alignment ring and surface for the biasing member.

As shown in FIGS. 2, 3A, and 3B, ball receiver 20 preferably comprises a base portion 20a and a ball receiving portion 20b. Ball receiving portion 20b comprises a cylindrical side wall 20c and a partially spherical inner surface 20d. Cylindrical side wall 20c extends longitudinally outwardly from spherical surface 20d of base portion 20a, and defines a ball receiving cavity or socket for pivotally receiving ball member 16b of mount 16. Cylindrical side wall 20c and base portion 20a slidably engage inner surface 26f of sleeve 26 as ball receiver 20 is moved by biasing member 22. Preferably, ball receiving socket 20 comprises an elastomeric material, such as polypropylene or the like, such that cylindrical wall 20c may flex radially inwardly as ball receiver 20 is moved longitudinally toward tapered end 26a of sleeve 26. Preferably, as best shown in FIG. 3A, cylindrical side wall 20c further comprises a plurality of notches 20g which extend longitudinally from a forward end 20h of ball receiver 20. Notches 20g facilitate substantially uniform compression of forward end 20h of ball receiver 20 as forward end 20h is compressed radially inwardly by tapered end 26a of sleeve 26, in response to a biasing force exerted on ball receiver 20 toward tapered end 26a by biasing member 22. A circumferential groove or channel 20j may be formed around an outer circumferential edge of partially spherical surface 20d and radially inwardly of cylindrical side walls 20c, to further facilitate inward bending of cylindrical walls 20c as the walls 20c engage tapered end 26a of sleeve 26.

Base portion 20a of ball receiver 20 defines partial spherical surface 20d at one end and further defines the means or element for aligning and guiding biasing member 22 at an end opposite the partial spherical surface 20d. Base portion 20a of ball receiver 20 comprises a substantially planar center region 20e and a raised or longitudinally extending annular, cylindrical outer region 20f. Raised annular outer portions 20f form a cylindrical side wall or guide around an outer circumferential edge of planar surface 20e, thereby defining a recessed, biasing member receiving portion of receiver 20. A forward end 22a of biasing member 22 is then received by the recessed portion and thereby aligned and secured within sleeve 26 by guide walls 20f.

Figure 6:
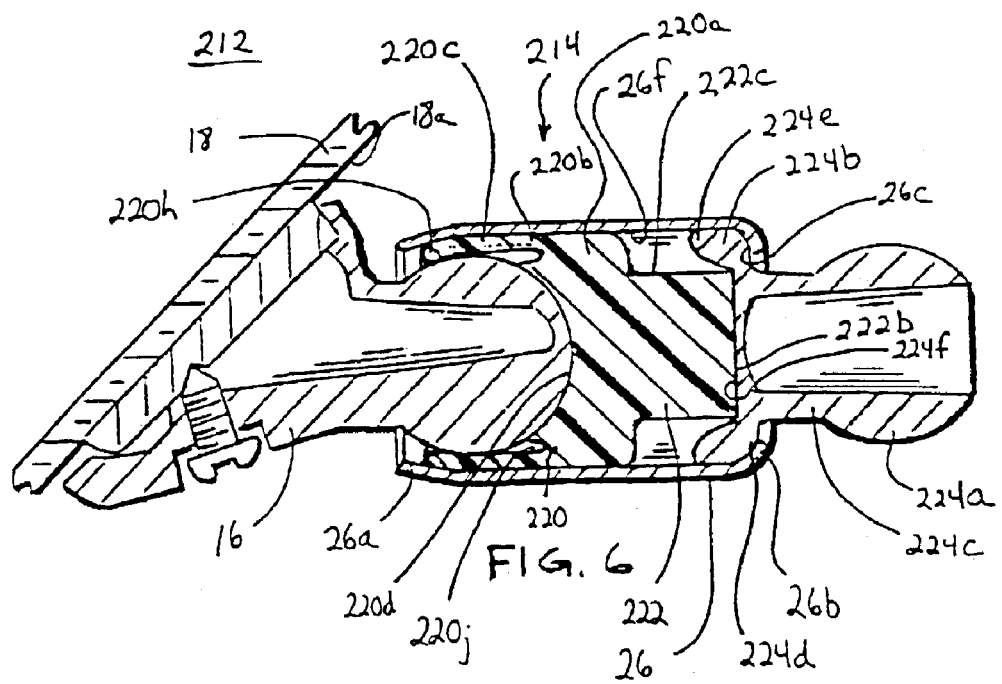
FIG. 6 is a sectional side view of another alternate embodiment of the present invention wherein the ball receiving socket further comprises the biasing member.

Second ball member 24 comprises a spherical shaped ball portion 24a, a base portion 24b, and a neck region 24c extending between base portion 24b and ball 24a. Ball portion 24a is positioned at an outer or rearward end of neck 24c, which extends from base portion 24b, such that ball 24a and neck 24c extend outwardly from end 26b of sleeve 26 in a direction generally rearwardly with respect to the vehicle. Preferably, ball 24a, neck 24c and base 24b are unitarily constructed and may be hollowed or cored in either direction to hollow out ball 24a and neck 24c to reduce the weight of the assembly. Ball member 24 may be substantially hollowed or cored from the forward end, as shown in FIG. 2, or may be cored from the rearward end of ball 24a, as shown in FIG. 6. Preferably, ball member 24 comprises a metal, such as aluminum, such as a die cast aluminum, which may be powder painted to match the color with sleeve 26 and/or mount 16 and/or the vehicle interior. However, it is further envisioned that other materials, such as an engineering polymer, such as a filled polymer, such as glass or mineral filled Nylon or the like, may be implemented without affecting the scope of the present in invention.

Base portion 24b is preferably correspondingly formed with inwardly curved end 26b of sleeve 26 and is positioned within sleeve 26 such that an outer shoulder 24e of base portion 24b engages annular ring 26c of sleeve 26, thereby substantially precluding second ball member 24 from moving longitudinally outwardly from sleeve 26. Preferably, ball member 24 is rigidly secured within sleeve 26, such as by welding the shoulder portion 24e to curved end 26b of sleeve 26, or by any other known means for securing the two components together. Alternately, the second ball member 24 may be unitarily formed with sleeve 26, without affecting the scope of the present invention. Base portion 24b of ball member 24 further comprises an outer confining member or annular ring 24d which extends longitudinally within sleeve 26 along the cylindrical side walls 26d, in a direction generally opposite from neck 24c. Annular ring or wall 24d defines and encircles a generally planar, annular ring or surface 24f formed at base portion 24b, such that a rearward end 22b of biasing member 22 engages surface 24f and is received within the recess formed by ring 24d and planar surface 24f. Although shown as an annular, ring shaped surface, planar surface 24f may otherwise be a substantially continuous surface if ball member 24 is not cored or hollowed, or if ball member 24 is cored from the opposite end, such as is shown in FIG. 6.

Biasing member 22 is preferably a coil spring, such as a steel spring having a spring rate of approximately 650 N/mm, although other materials and/or spring rates may be implemented without affecting the scope of the present invention. Biasing member 22 extends longitudinally within sleeve 26 and between the planar surfaces 20e and 24f of ball receiver 20 and ball member 24, respectively. Biasing member 22 is secured and aligned between the two components by the annular rings 20f and 24d, which extend longitudinally toward one another from the respective components 20 and 24. The annular flanges or walls 20f and 24d function to align and laterally confine biasing member 22, such that opposite ends 22a and 22b of biasing member 22 engage the substantially planar surfaces 20e and 24f of ball receiver 20 and ball member 24, respectively. Lateral or radial movement of biasing member 22 is thus substantially precluded by rings or walls 20f and 24d engaging an outer surface 22c of biasing member 22.

Accordingly, ball receiver 20 receives ball member 16b of mount 16, such that arm 14 is pivotally secured to mount 16. Second ball member 24 likewise engages a correspondingly formed ball receiver or socket (not shown) of interior rearview mirror 10, such that interior rearview mirror 10 is also pivotally mounted to mounting arm 14 of mounting assembly 12. Biasing member 22 is partially compressed when mounting arm 12 is assembled and engaged with ball member 16b of mount 16, such that biasing member 22 exerts a force longitudinally along sleeve 26 toward ball receiver 20. Because second ball member 24 is substantially fixed relative to sleeve 26, rearward end 22b of biasing member 22 is also substantially fixed relative to sleeve 26. Cylindrical side walls 20c of ball receiving portion 20b are then forced inwardly at tapered end 26a of sleeve 26, such that ball receiver 20 grips ball member 16b on mount 16 in response to the biasing force exerted by biasing member 22. Further longitudinal movement of ball receiver 20 is limited as outer end 20h of cylindrical wall 20c becomes wedged between sleeve 26 and ball 16b, since the diameter of ball 16b and cylindrical wall 20c is greater than the narrowed opening of narrowed end 26a of sleeve 26. The desired level of gripping of ball 16b by socket 20b may be attained by selecting an appropriate spring rate for biasing member 22 or by altering the coefficient of friction of ball receiver 20.

Because arm 14 comprises a ball-in (ball receiver 20 of arm 14 receives ball member 16b) and a ball-out (ball member 24 extends outwardly from arm 14) mounting arrangement, mounting arm 14 provides a shorter overall length, such that the pivot joints of the mounting assembly 12 are closer to the main support or mount 16, thereby reducing vibration of the mirror mount assembly. Furthermore, because ball member 24 is rigidly secured to or formed with the sleeve 26 of arm 14, there is less vibration in the mounting arm assembly. Ball 24a of ball member 24 may be the same size as ball 16b of mount 16, or may be of a greater diameter to enhance gripping within the corresponding receiving socket of the mirror, which further reduces vibration of the rearview mirror. Preferably, ball 24a has a greater diameter than ball 16b. More preferably, ball 24a has a diameter which is greater than approximately 20 mm, such as approximately 22.4 mm, while ball 16b has a diameter which is less than approximately 20 mm, such as approximately 15 mm. Alternatively, however, the ball 24a of ball member 24 may have a smaller diameter than the ball 16b of mount 16, without affecting the scope of the present invention.

Additionally, the present invention allows a smaller diameter spring to be implemented between the ball member 24 and ball receiver 20, while still maintaining proper alignment therebetween, since the longitudinally extending cylindrical side walls of ball receiver 20 and ball member 24 substantially preclude radial or lateral movement of biasing member 22 with respect to sleeve 26. A center ridge or bump on the ball receiver and/or the ball member to insert within the spring is not necessary to align the spring within the mounting arm. This approach further allows for ball member 24 to be cored out from its rearward end, as shown in FIG. 6, or its forward end, as shown in FIGS. 2 and 4, while still providing proper alignment of biasing member 22, all of which reduces weight and vibration in the assembly.

Figure 4:
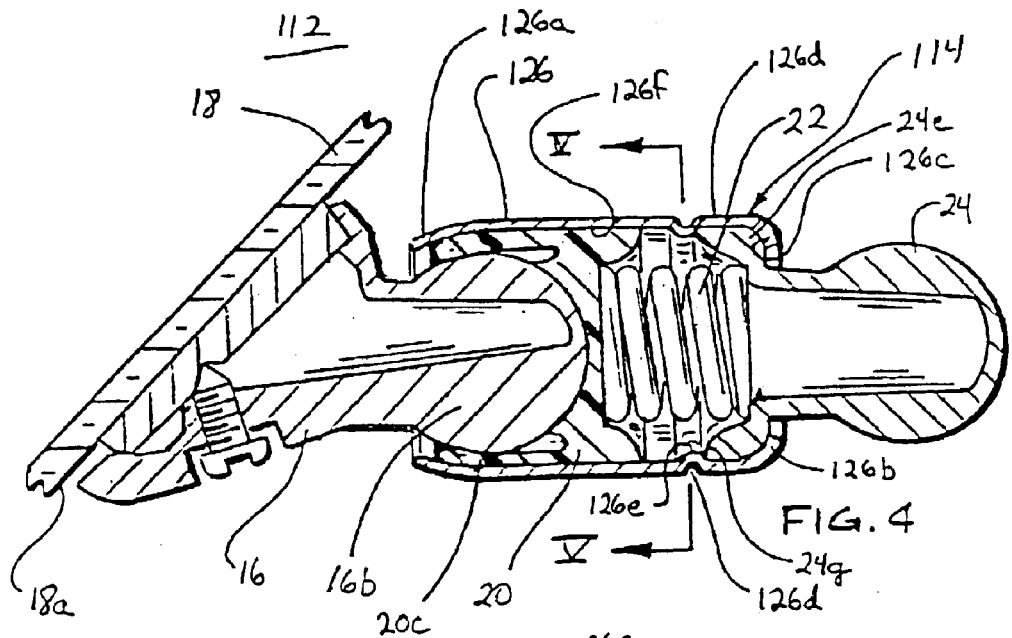
FIG. 4 is a sectional side view of an alternate embodiment of the present invention.
Figure 5:
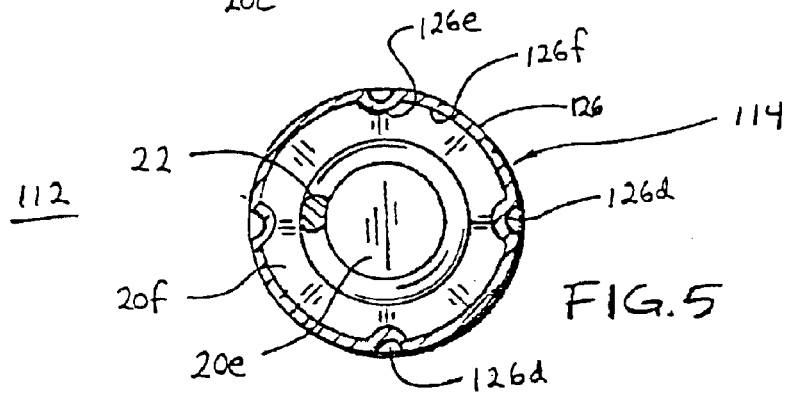
FIG. 5 is a sectional end view of the mounting arm, taken along the line V—V in FIG. 4.

Referring now to FIGS. 4 and 5, an alternate support bracket assembly 112 is shown, which comprises a mount 16 and an arm 114. Mount 16 is substantially identical to mount 16 discussed above with respect to support assembly 12, such that a detailed discussion of mount 16 will not be repeated herein. Arm 114 is likewise substantially similar to arm 14, discussed above, in that it comprises a sleeve 126, which substantially encases a ball receiving portion 20, a biasing member 22, and a second ball member 24. Ball receiving portion 20, biasing member 22, and second ball member 24 are also substantially similar to the components discussed above with respect to support assembly 12. Sleeve 126 is a generally cylindrical and hollow sleeve, which comprises a tapered or narrowed end 126a and an inwardly curved end 126b, similar to sleeve 26 discussed above. Likewise, tapered end 126a functions to force the cylindrical wall portions 20a of ball receiver 20 inwardly around ball member 16b of mount 16 in order to enhance gripping of ball 16b by receiver 20 and arm 14, such that arm 114 may pivot relative to ball member 16b, while ball member 16b is substantially precluded from being removed from socket 20 and sleeve 126. Inwardly curved end 126b comprises an annular ridge or lip 126c which engages an outer shoulder 24e of second ball member 24 to substantially preclude longitudinally outward movement of second ball member 24 relative to sleeve 126, similar to sleeve 26 and second ball member 24, discussed above.

Sleeve 126 preferably includes one or more dimples or indentations 126d, which are crimped inwardly to form bumps or ridges 126e along an inward surface 126f of sleeve 126. Ridges 126e are positioned immediately longitudinally inwardly from an innermost portion 24g of cylindrical guide walls 24e of ball member 24. As shown in FIG. 5, sleeve 126 may comprise multiple dimples 126d which are spaced circumferentially around sleeve 126. However, a single circumferential groove or indentation may extend around sleeve 126 and engage innermost surface 24g of ball member 24 along its entire circumference, without affecting the scope of the present invention. As discussed above with respect to sleeve 26, sleeve 126 preferably comprises a metal tubing, such as aluminum tubing, and may be powder coated to color match sleeve 126 with mount 16 and ball member 24 and/or the interior rearview mirror and/or the vehicle interior. However, other materials may be implemented, similar to sleeve 26. The dimples may be die cast in sleeve 126 or may be crimped or otherwise formed therein. The lip 126c and ridges 126e function to rigidly secure or retain ball member 24 within sleeve 26, thereby substantially precluding movement or vibration of ball 24 relative to sleeve 126 in either longitudinal direction. By reducing the possibility of relative movement between ball 24 and sleeve 126, overall vibration of arm 114 and support assembly 112 is reduced.

Figure 7:
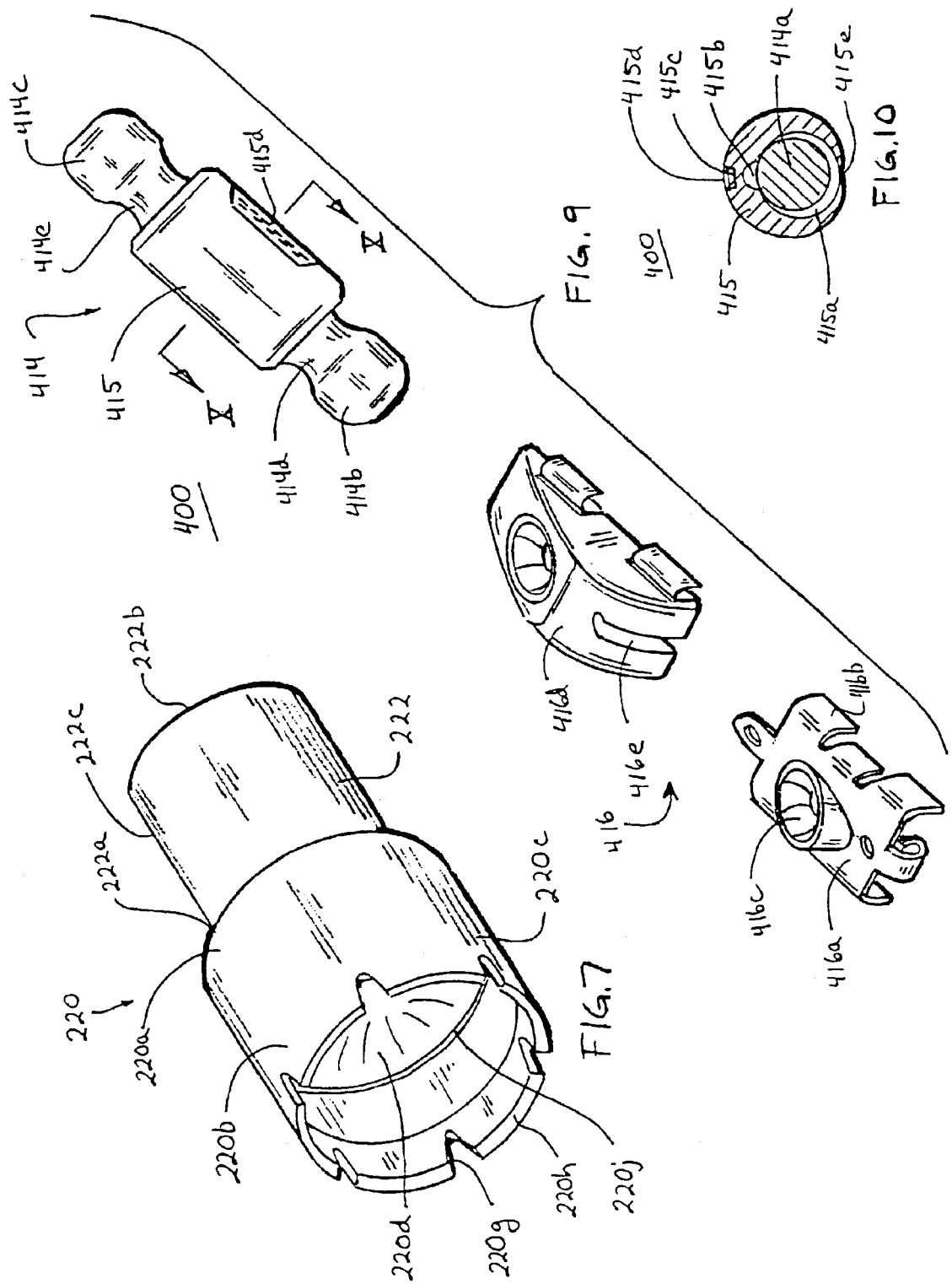
FIG. 7 is a perspective view of the ball receiving socket shown in FIG. 6.

Referring now to FIGS. 6 and 7, an alternate embodiment 212 of the mirror support assembly of the present invention is shown which comprises a mounting member 16 and an arm 214. Mounting member 16 is substantially identical to the mount 16 discussed above with respect to support assembly 12 such that a detailed description will not be repeated herein. Arm 214 comprises an outer sleeve 26 which at least partially encases a ball receiving socket 220 and a base portion 224b of a second ball member 224. Sleeve 26 is also substantially similar to sleeve 26 discussed above with respect to support assembly 12. Second ball member 224 is likewise similar to ball member 24 and comprises a partial spherical member 224a, a base region 224b and a neck region 224c extending between base region 224b and spherical portion 224a. Spherical portion 224a may be approximately the same size as ball 16b on mount 16 or may have a greater diameter than ball 16b, as discussed above with respect to ball 24b and ball 16b of support assembly 12.

Ball member 224 may be cored or hollowed from either end to reduce the weight of the assembly, similar to ball 24 discussed above. Preferably, ball member 224 is cored from an outer or rearward end, as shown in FIG. 6, such that base portion 224b defines a continuous, substantially planar surface 224f at its forward end. Base portion 224b comprises a cylindrical side wall or annular guide 224e which extends longitudinally inwardly along an inner surface 26f of sleeve 26. A substantially flat base surface 224f is formed along an inner surface of base portion 224b and is substantially encircled by cylindrical side walls 224e. As discussed above with respect to ball member 24 and sleeve 26 of support assembly 12, base portion 224b is formed to engage an annular ring 26c formed by inwardly curved portions 26b of sleeve 26, thereby substantially precluding longitudinal movement of ball 224 outwardly with respect to sleeve 26. Outer shoulders 224d of base portion 224b may be welded to sleeve 26, such as by a rough texture in die cast using a spin weld or lathe type process, or may be otherwise secured to inwardly turned portions 26b of sleeve 26.

Ball receiving member 220 comprises a ball receiving portion 220b and a biasing member portion 222. Ball receiving portion 220b comprises cylindrical side walls 220c, which may further comprise notches 220g at an outer end 220h thereof, and a base portion 220a, which further defines a partially spherical surface 220d within cylindrical walls 220c. An annular groove or channel 220j is formed around an outer edge of partially spherical surface 220d and immediately radially inwardly of cylindrical side walls 220c, to facilitate inwardly bending of cylindrical walls 220c as the walls 220c engage tapered end 26a of sleeve 26, similar to that discussed above with respect to support assembly 12.

Biasing member 222 is preferably unitarily formed with ball receiving portion 220b of ball receiver 220 and extends longitudinally from base portion 220a such that a forward end 222a of biasing member 222 is integrally formed with base portion 220a of ball receiver 220. Preferably, biasing member 222 is generally cylindrical and comprises an outer cylindrical wall 222c and a substantially flat or planar end surface 222b at an end of biasing member 222 opposite or rearwardly from base end 222a. Preferably, ball receiver 220, and thus biasing member 222 comprise an elastomer material which preferably has a spring rate of approximately 50 N/mm to 120 N/mm.

As assembled, ball receiver 220 is substantially encased by sleeve 26, as shown in FIG. 6. Biasing member 222 has a longitudinal length such that planar surface 222b engages flat planar surface 224f of ball member 224 within guide walls 224e. As assembled, biasing member 222 of ball receiver 220 is compressed such that biasing member 222 exerts a longitudinal force against base portion 220a. Tapered ends 26a of sleeve 26 prevent further longitudinally outward movement of ball receiver 220, since outer ends 220h of cylindrical side walls 220c become wedged between spherical ball member 16b and tapered end 26a of sleeve 26. Annular guide 224e engages outer cylindrical surface 222c of biasing member 222 and functions to properly align and retain biasing member 222, such that planar surface 222b of biasing member 222 remains substantially centered on base surface 224f of ball member 224.

Figure 8:
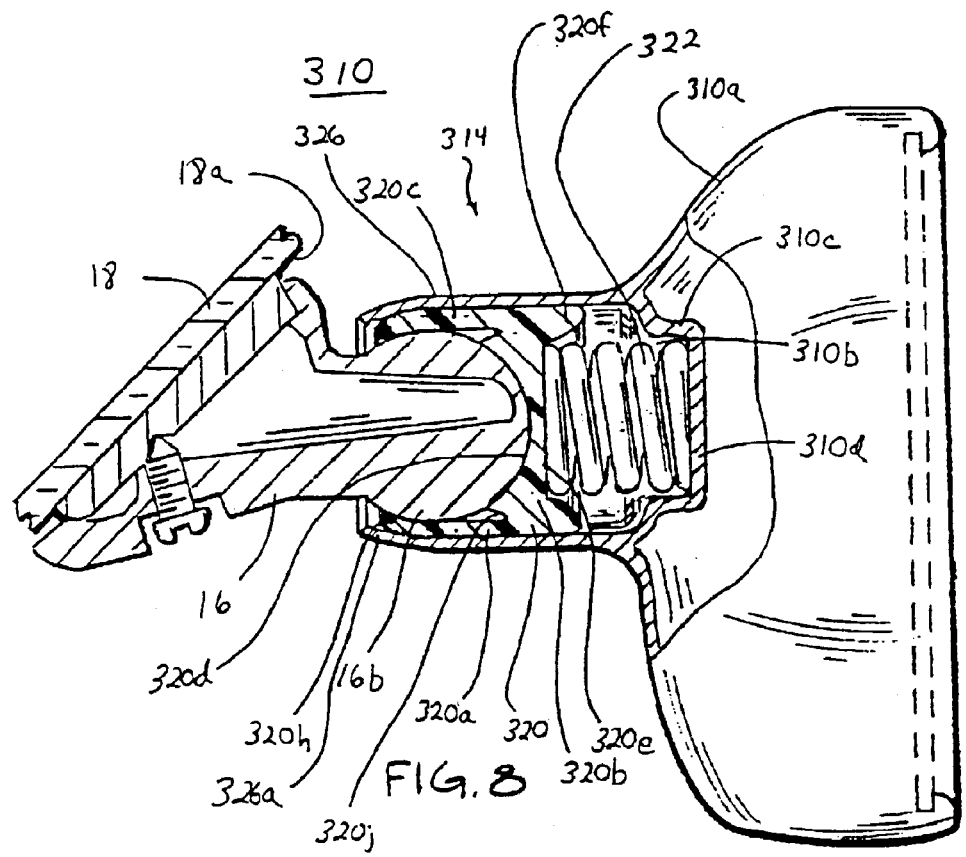
FIG. 8 is a sectional side view of another alternate embodiment of the present invention, wherein the mounting arm is fixedly secured to the interior rearview mirror.

Referring now to FIG. 8, an interior rearview mirror 310 comprises a mounting arm 314 which extends from a back surface 310a of interior rearview mirror 310 in a direction generally forwardly with respect to the vehicle. Mounting arm 314 comprises a substantially cylindrical sleeve portion 326 extending from back surface 310a of interior rearview mirror 310. Sleeve portion 326 is preferably fixedly secured to back 310a of interior rearview mirror 310 and may be unitarily formed with the mirror housing or casing. Sleeve portion 326 comprises an inwardly tapered or narrowed end 326a at an outer end opposite interior rearview mirror 310. A ball receiving socket 320 is positioned within sleeve 326 and is substantially similar to ball receiver 20, discussed above with respect to support assembly 12. A partial spherical surface 320b and a cylindrical side wall 320c receive a ball member 16b of a mount 16, which is substantially similar to mount 16 discussed above and is mounted to an interior surface 18a of windshield 18 in a known manner. A circumferential notch or channel 320j is formed between spherical surface 320d and walls 320c to facilitate radially inward flexing of walls 320c relative to partial spherical surface 320d. Tapered end 326a of sleeve 326 functions to force an outer end 320h of cylindrical wall 320c inward around ball member 16b, such that ball member 16b is pivotally secured within ball receiver 320 and sleeve 326. Mirror assembly 310 is thus pivotally mounted to mount 16 via a single pivot joint.

Ball receiver 320 further comprises a flat or planar surface 320e on a base portion 320a and generally opposite partial spherical surface 320d. A cylindrical, annular wall or guide portion 320f extends longitudinally inwardly toward interior rearview mirror 310 around a circumferential outer edge of planar surface 320e. Mirror assembly 310 further comprises a cylindrical cavity or recess 310b which extends inwardly into interior rearview mirror 310 or generally rearwardly with respect to the vehicle. Cylindrical cavity 310b is defined by a cylindrical side wall 310c and an inner, substantially flat or planar end surface 310d within interior rearview mirror 310. Cylindrical cavity 310b is generally centered with respect to sleeve 326, such that cylindrical cavity 310b is generally aligned with annular guide portions 320f of ball receiver 320.

A biasing member 322, such as a coiled spring or the like, is positionable between planar surface 320e of ball receiver 320 and planar surface 310d of interior rearview mirror 310. Biasing member 322 is guided and aligned between ball receiver 320 and interior rearview mirror 310 via the cylindrical side walls 310c of cavity 310b and guide walls 320f of ball receiver 320. As discussed above with respect to biasing member 22, biasing member 322 exerts a force on ball receiver 320 to press ball receiver 320 longitudinally along sleeve 326 such that cylindrical walls 320c of ball receiver 320 are pressed radially inwardly around spherical member 16b of mount 16, as ball receiver 320 is moved toward and engages tapered end 326a of sleeve 326, thereby facilitating pivotal engagement of connecting arm 314 on mount 16, while substantially precluding removal of ball 16b from sleeve 326. Although shown as a coil spring, biasing member may be any other known means for exerting a biasing force on socket 320, and may be integrally formed therewith, similar to biasing member 222 and socket 220, discussed above, without affecting the scope of the present invention. End 326a may be formed into the tapered or narrowed end after insertion of biasing member 322, ball receiving socket 320, and ball member 16b into cavity or recess 310b.

Therefore, the present invention provides an interior rearview mirror support assembly which may be pivotally attached to a ball mount at a windshield or headliner or console of the vehicle. The support assembly may provide one or more pivotable ball and socket joints which facilitate pivotal movement of an accessory, such as an interior rearview mirror, relative to the substantially fixed ball mount on the window or headliner of the vehicle. A biasing member is positioned within a portion of the mounting assembly to maintain a tight grip on the ball member of the mount, while allowing rotational movement between the ball mount and a ball receiver within the support assembly. The biasing member is maintained in alignment with the ball receiver via at least one annular, cylindrical guide wall extending longitudinally along a portion of the support assembly. The guide wall substantially precludes lateral movement of the biasing member to maintain the biasing member in a proper orientation with respect to the ball receiver and support assembly, such that the force exerted by the biasing member on the ball receiver remains in substantially the same direction and is substantially constant to provide a substantially constant gripping force of the ball mount by the ball receiver. The present invention further provides reduced vibration in the interior rearview mirror due to the rigid connection of the mirror ball member with the arm or sleeve and the substantially uniform engagement of the ball mount via the aligned biasing member and the cylindrical walls of the ball receiver.

Figure 11:
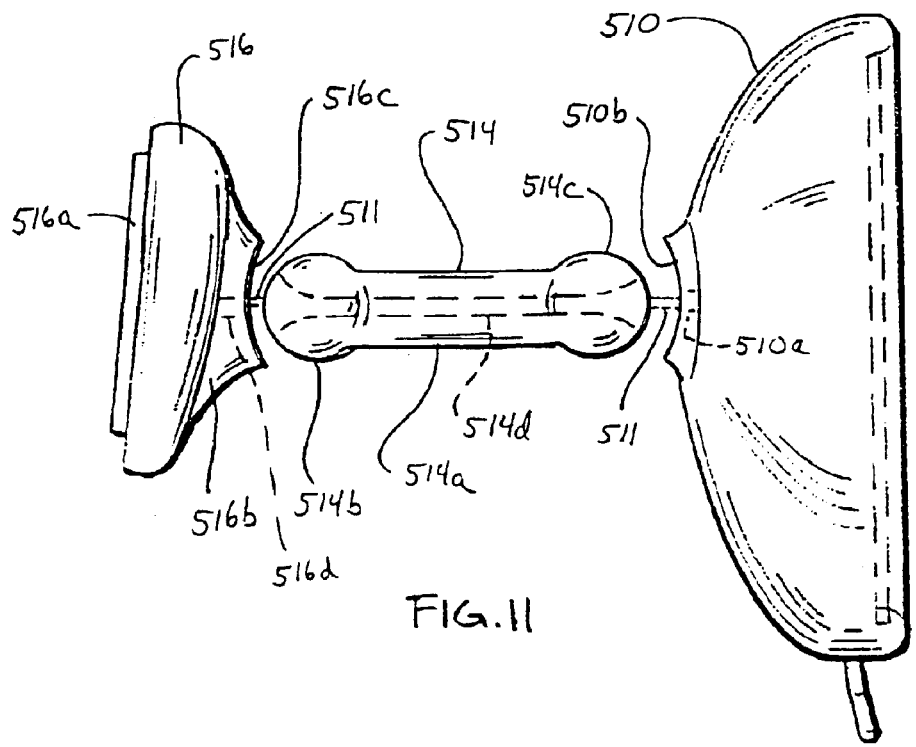
FIG. 11 is a side elevation of another embodiment of the bracket assembly of FIG. 9.

Referring now to FIGS. 9–11, an alternate embodiment 400 is disclosed which comprises a mount 416 and a mounting arm 414, which pivotally connects to the mount 416 at one end and to an interior rearview mirror at an opposite end. The interior rearview mirror may comprise one or more electronic components, such that a mirror wiring harness or the like (not shown) may be routed to the mirror to provide power and/or control of the electronic accessories via a vehicle wiring harness at the headliner of the vehicle. Mount 416 is preferably a breakaway mount, such as disclosed in commonly assigned U.S. Pat. No. 5,820,097, issued to Spooner, the disclosure of which is hereby incorporated herein by reference, but may be other button or channel mounts, without affecting the scope of the present invention.

Mount 416 preferably comprises a breakaway resilient retainer 416a, which is adapted to engage a button (not shown) secured to the windshield. Retainer 416a comprises a plurality of mounting flanges 416b for removably securing the retainer to the button, and a ball receiving socket 416c for pivotally receiving a ball member therein, as discussed below. Mount 416 further comprises a casing 416d which is mountable on retainer 416a to cover the retainer and provide a finished appearance to the mount 416. Preferably the cover 416d comprises a molded polymeric, plastic material, which may further include a channel 416e for a mirror wiring (not shown) to be routed and secured therethrough.

Mounting arm 414 is preferably a double ball arm, which comprises a central shaft portion 414a and opposite ball members 414b and 414c. Ball members 414b and 414c are attached to respective neck portions 414d and 414e at opposite ends of shaft portion 414a. A first ball member 414b is pivotally connectable to ball receiving socket 416c of mount 416, while the second ball member 414c is pivotally secured within a ball receiving socket of the interior rearview mirror (not shown). A socket such as that shown in embodiment 310 would be suitable. Mounting arm 414 further comprises a cover member 415, which substantially encases shaft portion 414a of arm 414. Preferably, as shown in FIG. 10, cover member 415 is slotted along its entire length to facilitate expansion of the slot or opening 415e for insertion of shaft 414a therewithin. Cover member 415 is biased to return to its closed position to secure shaft 414a within cover member 415. Cover member 415 preferably comprises a plastic material, such as polypropylene, EPDM, or the like, and is preferably moldable in a desired color to match the interior rearview mirror or interior color scheme or trim of the vehicle. As shown in FIG. 10, cover member 415 has a generally circular cross-section, which defines a generally circular passageway 415a extending therealong. A channel or groove 415b is also provided along passageway 415a to provide a passageway for the mirror wiring harness between the wiring channel 416e of mount 416 and the interior rearview mirror.

It is further envisioned that cover member 415 may further comprise a recess 415c and a slotted cover plate 416d which covers or encloses recess 415c. Recess 415c may contain scented inserts or the like, for providing an air freshener in the vehicle, which would not be visible to an occupant of the vehicle. Additionally, recess 415c may be positioned substantially adjacent to wiring groove or channel 415b, such that the scented inserts may be of the type whereby performance is enhanced through heating, with the heat being provided by the resistance in the wiring when one or more of accessories associated with mounting arm 414 is in use.

Referring now to FIG. 11, an alternate embodiment of the invention comprises a mounting base 516, a mounting arm 514 and an accessory such as an interior rearview mirror 510. The interior rearview mirror may comprise one or more electronic accessories, such that a mirror wiring 511 is connectable between interior rearview mirror 510 and a vehicle wiring harness or wiring (not shown). Mount 516 is mountable to an interior surface of the windshield and comprises a mounting button or the like 516a and a ball receiving mounting retainer 516b, which is mountable to button 516a to secure mount 516 to the windshield or the like. Retainer 516b preferably comprises a ball receiving socket 516c for receiving a ball member, as discussed below. Preferably, a wiring passageway 516d is provided in retainer 516b to facilitate routing of the mirror wiring through the retainer and into ball receiving socket 516c. Preferably, retainer 516b further comprises a cover to provide a finished appearance to the mount 516. The cover preferably comprises a plastic material, which may be molded in color to match the color of the trim or accessories of the vehicle.

Mounting arm 514 is preferably a double ball mounting arm, which comprises a central shaft portion 514a and a ball member 514b and 514c positioned at opposite ends of the shaft portion 514a. A passageway 514d is provided through mounting arm 514, preferably through a center portion of ball members 514b and 514c and shaft portion 514a, for receiving and routing the mirror wiring 511 from passageway 516d of mount 516 to a corresponding passageway 510a of interior rearview mirror 510. Mirror assembly 510 comprises a ball receiving socket 510b for receiving ball member 514c of arm 514 and a wiring passageway 510b for receiving the mirror wiring from passageway 514d and arm 514. Ball receiving socket 516c of mount 516 likewise receives ball member 514b of arm 514, such that the wiring which is routed through passageway 516d in mount 516 is further routed through passageway 514d of arm 514 and into passageway 510b of interior rearview mirror 510. Preferably, passageway 514d is flared outwardly at either end to facilitate movement of the mirror wiring as one or both ball members are pivoted within their respective sockets, thereby substantially reducing the possibility of cutting or damaging the wiring as the mirror and/or arm 514 are pivoted relative to the mount 516.

Changes and modifications in the specifically described embodiments can be carried out without departing from the principles of the invention, which is intended to be limited only by the scope of the appended claims, as interpreted according to the principles of patent law.

The embodiments of the invention in which an exclusive property right or privilege is claimed are defined as follows:

1. A support assembly for pivotally securing an interior rearview mirror to a vehicle, the interior rearview mirror having at least one electronic component which is electrically connected to a vehicle wiring via an accessory wiring, said support assembly comprising:

a mounting base adapted for mounting to the vehicle, said mounting base comprising a first ball receiving socket; and a mounting arm pivotally secured to said mounting base and to the interior rearview mirror, said mounting arm comprising a first ball member for pivotally engaging said first ball receiving socket and a second ball member for pivotally engaging a second ball receiving socket of the interior rearview mirror, said first ball member being positioned at an opposite end of said mounting arm from said second ball member, said mounting arm having an outer surface between said ball members, said support assembly further comprising an outer sleeve which at least partially encases said outer surface of said mounting arm and the accessory wiring, said outer sleeve comprising a channel therealong for receiving the accessory wiring.

2. The support assembly of claim 1, wherein said mounting base further comprises a wiring passageway for encasing a portion of the accessory wiring as it is routed to and within said outer sleeve.

3. The support assembly of claim 1, wherein said mounting base is securable to an interior surface of a windshield of the vehicle.

4. A support assembly for pivotally securing an accessory to a vehicle, the accessory having at least one electronic component which is electrically connected to a vehicle wiring via an accessory wiring, said support assembly comprising:

a mounting base adapted for mounting to the vehicle, said mounting base comprising a first ball receiving socket; and a mounting arm pivotally secured to said mounting base and the accessory, said mounting arm comprising a first ball member for pivotally engaging said first ball receiving socket and a second ball member for pivotally engaging a second ball receiving socket on the accessory, said first ball member being positioned at an opposite end of said mounting arm from said second ball member, said mounting arm further comprising an outer sleeve which at least partially encases said mounting arm and the accessory wiring, said outer sleeve comprising channel therealong for receiving the accessory wiring, wherein said outer sleeve of said mounting arm comprises a recessed portion and a perforated cover over said recessed portion, said recessed portion being adaptable to receive scented inserts therein.

5. The support assembly of claim 4, wherein the accessory is an interior rearview mirror.

6. The support assembly of claim 4, wherein said recessed portion is positioned adjacent to said channel, such that heat generated by the accessory wiring in said channel is at least partially received in said recessed portion.

* * * * *